United States Patent [19]

Mandich

[11] Patent Number: 5,395,472
[45] Date of Patent: Mar. 7, 1995

[54] LINING SYSTEM AND METHODS FOR INSTALLING PLASTIC LINERS IN A PIPE

[76] Inventor: Ivan C. Mandich, 356 Audubon St., New Orleans, La. 70118

[21] Appl. No.: 977,853

[22] Filed: Nov. 17, 1992

[30] Foreign Application Priority Data

Aug. 20, 1992 [EP] European Pat. Off. ............ 92114244

[51] Int. Cl.6 ............................................ B29C 63/34
[52] U.S. Cl. ........................ 156/287; 138/97; 138/114; 138/148; 156/292; 156/294; 264/230; 264/516; 264/573
[58] Field of Search ............... 156/274.2, 287, 294, 156/292, 308.4; 138/97, 114, 148; 264/269, 516, 573, 230

[56] References Cited

U.S. PATENT DOCUMENTS

| | | |
|---|---|---|
| 677,142 | 6/1901 | Richardson et al. . |
| 1,570,915 | 1/1926 | Nose . |
| 2,423,260 | 7/1947 | Slaughter . |
| 2,668,987 | 2/1954 | Harris et al. . |
| 2,724,672 | 11/1955 | Rubin . |
| 2,794,758 | 6/1957 | Harper et al. ................ 156/294 |
| 2,823,418 | 2/1958 | Fritts . |
| 2,955,318 | 10/1960 | Cook et al. . |
| 2,971,225 | 2/1961 | Woodruff et al. . |
| 2,980,161 | 4/1961 | Howard . |
| 3,132,062 | 5/1964 | Lang et al. .................. 156/294 |
| 3,192,612 | 7/1965 | Elliott et al. . |
| 3,335,758 | 8/1967 | Bertolet, Jr. . |
| 3,359,599 | 12/1967 | Martin et al. . |
| 3,371,770 | 3/1968 | Graham et al. . |
| 3,429,954 | 2/1969 | Atkins et al. . |
| 3,543,334 | 12/1970 | Sudo . |
| 3,560,295 | 2/1971 | Kimbrell et al. . |
| 3,662,045 | 5/1972 | Tierling . |
| 3,755,524 | 8/1973 | McKay . |
| 3,758,361 | 9/1973 | Hunter . |
| 3,856,905 | 12/1974 | Dawson . |
| 3,897,530 | 7/1975 | Leathers . |
| 3,959,424 | 5/1976 | Dawson et al. . |
| 3,996,967 | 12/1976 | Takada . |
| 4,020,136 | 4/1977 | Zaro . |
| 4,028,037 | 6/1977 | Dawson . |
| 4,157,194 | 6/1979 | Takahashi ..................... 138/148 |
| 4,207,130 | 6/1980 | Barber ........................... 156/287 |
| 4,233,101 | 11/1980 | Scragg et al. . |
| 4,273,605 | 6/1981 | Ross . |
| 4,321,740 | 3/1982 | Davis et al. . |
| 4,350,548 | 9/1982 | Zenbayashi et al. . |
| 4,361,451 | 11/1982 | Renaud . |
| 4,368,091 | 1/1983 | Ontsuga et al. . |
| 4,377,894 | 3/1983 | Yoshida . |
| 4,394,202 | 7/1983 | Thomas et al. . |
| 4,410,391 | 10/1983 | Thomas et al. . |
| 4,427,480 | 1/1984 | Kamuro et al. . |
| 4,434,115 | 2/1984 | Chick . |

(List continued on next page.)

FOREIGN PATENT DOCUMENTS

| | | | |
|---|---|---|---|
| 217080 | 11/1956 | Australia | ............... 156/274.2 |
| 682774 | 6/1966 | Belgium . | |
| 1084224 | 8/1980 | Canada . | |
| 0065886 | 12/1982 | European Pat. Off. . | |
| 0098547 | 1/1984 | European Pat. Off. . | |
| 1194226 | 11/1959 | France . | |
| 1394807 | 12/1965 | France . | |
| 2487702 | 2/1982 | France . | |
| 2503622 | 10/1982 | France . | |
| 1912478 | 10/1970 | Germany . | |
| 3519439 | 12/1985 | Germany . | |

(List continued on next page.)

OTHER PUBLICATIONS

Translation of JA 53-9878.

Primary Examiner—Michael W. Ball
Assistant Examiner—Steven D. Maki
Attorney, Agent, or Firm—Nixon & Vanderhye

[57] ABSTRACT

A method for installing plastic liners in pipes includes the steps of providing a plurality of cylindrical tubular liners of plastic material of predetermined diameters. Ribs extend radially between the liners. The liners are deformed or collapsed to reduced overall diameters. The liners are introduced into the pipe. The cylindrical shapes of the liners in the pipe are then restored with the ribs spacing the liners one from the other.

32 Claims, 8 Drawing Sheets

U.S. PATENT DOCUMENTS

| | | |
|---|---|---|
| 4,446,891 | 5/1984 | Gebelius . |
| 4,456,401 | 6/1984 | Williams . |
| 4,483,167 | 11/1984 | Hayashi . |
| 4,496,499 | 1/1985 | Brittain et al. . |
| 4,504,171 | 3/1985 | Florence, Jr. . |
| 4,627,471 | 12/1986 | Parkes et al. . |
| 4,643,855 | 2/1987 | Parkes et al. . |
| 4,650,703 | 3/1987 | Kleinheins . |
| 4,691,740 | 9/1987 | Svetlik et al. . |
| 4,754,781 | 7/1988 | Jan de Putter ............ 138/148 |
| 4,810,453 | 3/1989 | Clarke et al. . |
| 4,818,314 | 4/1989 | Brittain et al. . |
| 4,863,365 | 9/1989 | Ledoux et al. . |
| 4,867,921 | 9/1989 | Steketee, Jr. . |
| 4,965,036 | 10/1990 | Miyazaki et al. ............ 156/294 |
| 4,985,196 | 1/1991 | Ledoux et al. . |
| 4,986,951 | 1/1991 | Ledoux et al. . |
| 4,995,427 | 2/1991 | Berchem ............... 138/148 |
| 4,995,929 | 2/1991 | Menzel ............... 156/294 |
| 4,998,871 | 3/1991 | Ledoux ............... 425/140 |
| 5,034,180 | 7/1991 | Steketee, Jr. ............ 156/294 |
| 5,091,137 | 2/1992 | Ledoux . |
| 5,112,211 | 5/1992 | Ledoux et al. . |
| 5,335,872 | 8/1994 | Clubbs ............... 138/98 |

FOREIGN PATENT DOCUMENTS

| | | | |
|---|---|---|---|
| 9878 | 1/1978 | Japan ............... | 156/294 |
| 60-228130 | 11/1985 | Japan . | |
| 61-290037 | 12/1986 | Japan . | |
| 536703 | 6/1973 | Switzerland . | |
| 275964 | 3/1928 | United Kingdom . | |
| 807413 | 1/1959 | United Kingdom . | |
| 820121 | 9/1959 | United Kingdom ...... | 156/272.2 |
| 1340068 | 12/1973 | United Kingdom . | |
| 1352829 | 5/1974 | United Kingdom . | |
| 1437273 | 5/1976 | United Kingdom . | |
| 2003576 | 3/1979 | United Kingdom . | |
| 1553408 | 9/1979 | United Kingdom . | |
| 2018384 | 10/1979 | United Kingdom . | |
| 1580438 | 12/1980 | United Kingdom . | |
| 2080917 | 2/1982 | United Kingdom . | |
| 2084686 | 4/1982 | United Kingdom . | |
| 2094862 | 9/1982 | United Kingdom . | |
| 2184194 | 6/1987 | United Kingdom . | |
| 2186340 | 8/1987 | United Kingdom . | |
| 2188695 | 10/1987 | United Kingdom . | |
| WO87/03840 | 7/1987 | WIPO . | |
| WO88/04987 | 7/1988 | WIPO . | |
| 3957 | 5/1989 | WIPO ............... | 138/97 |

LINING SYSTEM AND METHODS FOR INSTALLING PLASTIC LINERS IN A PIPE

BACKGROUND AND SUPPLY OF THE INVENTION

This invention relates to a method of installing plastic liners within pipelines, either initially or as repair, for protecting the internal walls of the pipelines from deterioration. The invention further relates to tubular plastic liners as installed in pipelines. For deteriorated or damaged pipelines the liner restores the fluid transporting capability of the pipelines and prevents further interior deterioration.

One method and a respective liner for protecting the interior of pipelines is disclosed by French Patent No. 81 07 346 to Laurent. In that patent, there is disclosed a cylindrical liner of plastic material having historic time memory properties, i.e., shape memory characteristics, the liner being deformed to a predetermined reduced overall diameter at an appropriate temperature. The deformed liner is introduced into the pipeline, and hot steam or fluid is forced into the liner sufficient to obtain an average crystallization temperature of the material so that the deformed liner assumes its original cylindrical shape. Pressure is then applied within the liner to conform the liner to the interior contour of the pipe.

Another method for installing a plastic liner within a pipe is described in British Patent Specification 1 580 438 or in the PCT application PCT/AU86/00362. This known method uses liners of semi-rigid plastics material, and provides the following steps: forceably mechanically collapsing the liner so as to form at least one longitudinally extending depression, fixing a longitudinally extending tearable strap to or about the liner so as to maintain the collapsed configuration, introducing the collapsed liner in its maintained collapsed configuration into the pipe for a desired distance along and within the pipe and releasing the strap in order to restore the tube to its original shape, thus making use of the spring rebounding effect of the liner material.

U.S. Pat. No. 5,034,180 discloses a method for installing a liner of plastic material in a pipe. The method of this patent uses a thin flexible tubular membrane providing a heat containment tube for insertion into and inflation within an underground conduit to be repaired. The thermally deformed liner is inserted into the tube while hot, and flexible. The tubular membrane is pressurized to exclude unwanted fluids from within the existing conduit. Then, hot steam is injected into the tube to heat the pipe for its full length externally and internally until it assumes its original circular shape, the liner being thereby expanded against the walls of the pipe, with a flexible tubular membrane therebetween.

All of these known methods rely on the thermal deformation or mechanical collapsing of the plastic liners, and to the respective restoration of the deformed liner in the pipe. These processes are restricted to liners which do not exceed a pre-given wall thickness and this affects the reliability of the lined pipe in some cases.

The present invention provides a multiple tubular liner arrangement of plastic material, including a cylindrical first tubular liner of deformable or collapsible plastic material, the external diameter of the first liner corresponding to the internal diameter of the pipe to be lined, and a cylindrical second tubular liner of deformable or collapsible plastic material for closely fitting into the first liner. Ribs extend radially between the inner surface of the first liner and the outer surface of the second liner for spacing the liners relative to each other.

The present liner-within-a-liner system is useful not only for rehabilitation of dilapidated pipelines but also in the installation of new pipelines. The benefit of introducing two liners in the pipe, with ribs extending radially between the two lines, includes the formation of longitudinally extending continuous holes between the inside of the first liner and the outside of the second liner or between adjacent liners when more than two liners are employed. These holes enable the insertion of a sensing system along the first liner to provide information concerning any failure of the inner liner. By inserting into the pipeline two liners with a rib-structure between the liners, a large wall thickness can be established with each liner having a comparatively thin wall thickness and a corresponding flexibility which facilitates installation of the liners into the pipes. Although there is avoidance of a massive wall and material use, the effective wall thickness is correspondingly increased. The holes provided by the rib-structure function as conveyors of potential problems which may exist in the pipeline.

In a preferred embodiment of the invention, at least one of the liners consists of plastic material, e.g., polyethylene, having shape, of historic time, memory properties. The liner is deformed at or above deforming temperature and below the crystallization temperature of the material. The deformed liner in the pipe is restored to its cylindrical shape by forcing hot steam or another hot fluid along the liner, the temperature of the steam or fluid being sufficient to obtain an average crystallization temperature of the plastic material so that the liner will restore to its circular cross-section and closely fit into the pipe.

When both liners consist of plastic material with shape memory properties, then both liners are deformed thermally and mechanically at or above the deforming temperature and below the crystallization temperature of the liners. Then, the restoration of the cylindrical shapes of both liners is realized by passing hot steam or fluid into the space between both liners. This processing has the benefit of reducing the volume of the necessary hot steam or liquid thereby reducing the steam or liquid requirement regardless of the size of the pipe and economizing the overall production costs.

To conform both liners to the interior contour of the pipe, pressurized air or liquid, i.e., fluid, is passed into the second liner after the liners are heated above their crystallization temperature. The second liner is thus pressed via the ribs against the first liner which closely conforms to the inner wall of the pipe.

To facilitate installation of the second liner, it may be preferable to first partially open the first liner after its installation in the pipe. To accomplish this, hot steam or fluid sufficient to obtain an average deforming or higher temperature of the plastic liner material or obtain sufficient opening of the first liner to receive the second liner, is forced into the first liner after its introduction into the pipe, and the steam may be pressurized to partially widen the cross-section of the first liner to facilitate the introduction of the second liner.

In a preferred alternative, one or both or all of the liners may comprise a semi-rigid plastic material. The liner(s) is collapsed by mechanical force so as to form at least one longitudinally extending depression. To maintain the collapsed configuration, a longitudinally extending tearable strap is fixed to or about the liners(s). The strap is torn off after the collapsed liner is introduced into the pipe or the first liner, respectively. As in all embodiments hereof, ribs extend radially between the inner surface of the first liner and the outer surface of the second liner, i.e., between the inner and outer surfaces of next adjacent liners. The ribs space the liners relative to each other. To restore the cylindrical shape of the liners, pressure may be exerted in the first and/or second liner or within all liners to support the spring rebounding effect by which inherent elastic spring forces bring the liner(s) back to its cylindrical cross-sections.

It is particularly preferred to secure the liners one to the other in a final step after the liners are—via the ribs—in intimate contact with each other. This securement can be made either by electro or heat fusion or welding, by gluing, bonding or mechanically snapping. This integral connection of the liners results in a high strength compound liner structure having a large effective wall thickness with corresponding rigidity and strength, and yet the structure avoids the massive walls end corresponding amount of material, and simultaneously provides longitudinally extending holes or voids between the rib-structure which allows permanent failure control of the liners. For example, by a fiber optic sensing system introduced into the longitudinal holes, it is possible to instantly detect and locate leaks. Thus, where, for example, two liners are employed, the present invention enables double containment protection for the pipe, large effective wall thickness affording high strength and avoids disadvantages associated with minimum material and wall thickness due to the rib-structure of the integrally connected first and second liners.

Preferably, fusion of the two liners is an electrofusion with wires embedded in the contact areas of the liners running in the longitudinal direction of the liners from one end to the other. The wires are energized by electrical energy when the fusion is to be carried out.

As an alternative, electrofusion may be accomplished by using plastic material with electroconductive resistive contact zones or having ultra-high molecular weight polyethylene added to the plastic material, the liners being electrofused when contacting each other due to the electroconductive properties of the added ultra-high molecular weight polyethylene.

As another preferred alternative, the fusion of the two liners may be accomplished by passing hot steam or hot fluid through preformed fusion channels. The channels are preferably formed at the contacting areas of the liners, for example, at the free ends of ribs, the channels running in the longitudinal direction of the liners. The temperature of the fluid is sufficient to cause the plastic material of the ribs to fuse with the liner.

In another preferred embodiment of the invention, the two liners are glued or bonded together at their contact areas. Beads of hot melt adhesives are preferred for gluing the liners together and may be provided along the outer edges of the ribs. Hot steam is passed into the liners, having a temperature sufficient to activate the adhesive.

The ribs between the liners may be integrally formed, for example, in the case of two liners, at the inner surface of the first liner and/or at the outer surface of the second liner. The ribs extend preferably in the longitudinal direction of the liners, In alternative forms, the ribs may extend in circumferential or helical directions around the liners.

Preferably, the ribs have rectangular, trapezoidal or partly cylindrical cross-sections. The ribs may also be intermittently arranged to provide an interface between rib-created voids. As the free ends of the ribs contact the outer surface of the second liner and the inner surface of the first liner, respectively, the fusion means, for example embedded wires or beads of hot melt adhesive, are embedded at the free end of the ribs. Additionally, small channels are provided in longitudinal direction at the free ends of the ribs for passing hot steam or fluid through the channels to fuse the free ends of the ribs of one liner to the contacting surface of the other liner or to liquefy the hot melt adhesive and hence adhesively bond the liners to one another.

In a preferred step, a curing compound is molded or injected into the grooves between the liners if additional strength and material is required. As filler material, fly ash, perlite or expanded stearine are preferred, but other suitable compounds may be used as well.

Further, where three liners are used, the third cylindrical liner may be introduced into the second liner in the same way as the second liner is introduced into the first liner. This increases the effective wall thickness to an even greater extent. A rib-structure is similarly provided between the third and second liners. Also, the third liner may be integrally fixed to the second liner at the free ends of the ribs to enhance the strength and the lining properties.

In a preferred embodiment according to the present invention, there is provided a method of lining a pipe, comprising the steps of providing a first tubular liner of plastic material deformed from a generally cylindrical shape having an external diameter corresponding generally to the internal diameter of the pipe to be lined to a reduced diameter enabling reception of the deformed lining in the pipe, providing a second tubular liner of plastic material deformed from a generally cylindrical shape having a predetermined external diameter to a reduced diameter enabling reception of the second liner in the first liner, providing ribs between the inner surface of the first liner and the outer surface of the second liner for spacing the liners relative to each other in the pipe, introducing the first deformed liner into the pipe, introducing the second deformed liner into the first liner and restoring the deformed liners while in the pipe to their respective cylindrical shapes to enable the first liner to bear against the internal surface of the pipe and the first and second liners to contact one another by way of the ribs.

In a further preferred embodiment according to the present invention, there is provided a lining system for a pipe comprising a first tubular liner of plastic material deformed from a generally cylindrical shape having an external diameter corresponding generally to the internal diameter of the pipe to a reduced diameter enabling reception of the deformed liner in the pipe, a second tubular liner of plastic material deformed from a generally cylindrical shape having a predetermined exterior diameter to a reduced diameter enabling reception of the second liner in the first liner, the deformed first and second liners being reformable into the cylindrical shapes, respectively and a plurality of ribs carried by one of the first and second liners and extending radially between the inner surface of the first liner and the outer surface of the second liner for spacing the liners relative to each other when the liners are reformed into their respective cylindrical shapes in the pipe.

In a further preferred embodiment according to the present invention, there is provided a lining system for a pipe comprising a first tubular liner of plastic material having a generally U-shaped cross-section enabling reception of the U-shaped liner in the pipe, a second tubular liner of plastic material having a generally U-shaped cross-section enabling reception of the second generally U-shaped liner in the first liner, the first and second liners being reformable from their respective generally U-shaped cross-sections into generally cylindrical shapes, respectively, and a plurality of ribs carried by one of the first and second generally U-shaped liners and projecting between the inner surface of the first liner and the outer surface of the second liner for spacing the liners relative to each other when the liners are reformed into their respective cylindrical shapes in the pipe.

It is therefore a general object of the present invention to provide a method for installing plastic liners in a pipe, wherein the method increases the reliability, safety and risk control of the lined pipe.

It is a further object of the present invention to provide a tubular plastic liner arrangement with increased reliability, safety and risk control as compared with known liners.

These and further objects and advantages off the present invention will become more apparent upon reference to the following specification, appended claims and drawings.

DETAILED DESCRIPTION OF THE DRAWINGS FIGURES

Reference will now be made in detail to a present preferred embodiment of the invention, all example of which is illustrated in the accompanying drawings.

Referring now the drawings, the present invention is concerned with lining new and sold pipes forming part of or complete pipelines with two or more generally concentric liners. The discussion herein generally relates to a lining system employing two liners, i.e., first and second or inner and outer liners, but it will be appreciated that additional liner or liners may also be employed in like manner. The liners are pulled into the pipe in sequence, first, an outer liner; thereafter, a second, e.g., inner, liner. The liners are connected in the pipeline to one another to provide a single or unitary stable compound liner which fits tightly with the pipe. The tubular liners can be made of any suitable plastic material which will collapse and subsequently return to its original cross-section either by shape, i.e., historic time, memory properties of the material or by the inherent elastic properties of the material.

To tightly fit in its reformed state within the pipe, the tubular liner may have an exterior diameter generally corresponding to the internal diameter of the pipe. However, the tubular liner preferably has an exterior diameter at least as large as the interior diameter of the pipe into which it is to be inserted and more preferably slightly in excess of the pipe diameter in order that the tubular liner is under slight circumferential compression when it is in operating position in the pipe. Further, the second tubular liner, which is to be inserted into the first liner, has an original exterior overall diameter generally corresponding to the internal diameter of the first liner. However, the second or inner tubular liner has an exterior diameter preferably at least as large as the interior diameter of the first liner, so that the second tubular liner fits tightly within the first liner and is under slight circumferential compression in its operating position.

Figure 1:
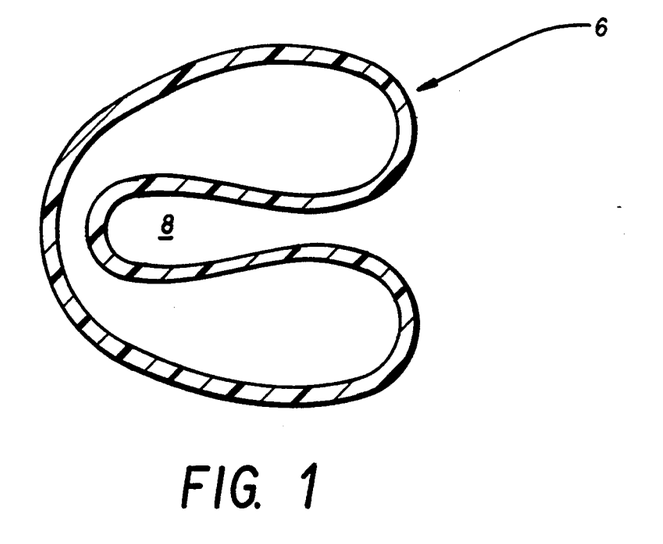
FIG. 1 is a cross-sectional view through a first liner in its deformed or collapsed configuration.

Referring now to FIG. 1, there is illustrated a cross-section of a first tubular liner 6 in its deformed or collapsed state and which has a reduced overall diameter as compared to its diameter when in a cylindrical configuration. In accordance with a preferred embodiment of the invention, the first liner is formed of plastic material, e.g., high-density polyethylene, with shape memory properties. When using such material, the first liner 6 is deformed into a generally U-shaped cross-section according to FIG. 1 by mechanically initiating and processing the fold 8 at a temperature range between the deforming temperature and the crystallization temperature of the polyethylene material, i.e., for example, between 75° C. and 113° C. When the material is cooled down, the tubular first liner 6, preserves its deformed shape, so that it can be pulled into a pipe, is in FIG. 2. An apparatus and method for deforming the liner as well as an identification of materials and temperatures used in the liner deforming method and a method of installation of such liner are disclosed in U.S. Pat. No 4,998,871, issued Mar. 12, 1991 and of common assignee herewith, the entire disclosure of which is incorporated by reference herein.

Figure 3:
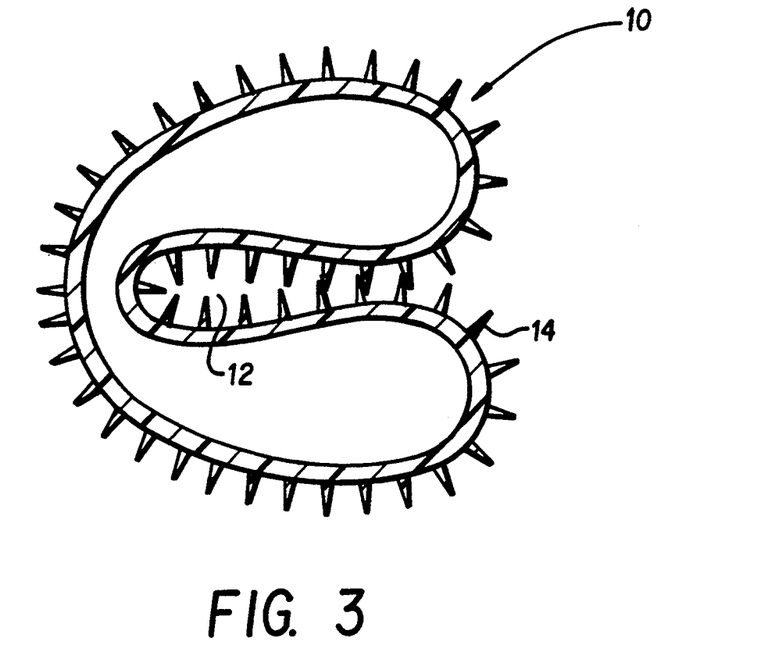
FIG. 3 is a cross-sectional view through a second liner to be introduced into the first liner.

Referring now to FIG. 3, a second or inner tubular liner 10 is provided having radially outwardly extending, circumferentially spaced, ribs 14 about its inner surface. The ribs 14 are uniformly spaced one from the other circumferentially about the liner and extend longitudinally along the outer surface of liner 10. As indicated previously, the original external overall diameter of the second liner, i.e., the diameter of a circle connecting the free ends of the ribs is selected such that it is preferably slightly larger than the inner diameter of the first liner 6. Conversely, the ribs may be provided along the interior diameter of the outer liner 6 although they are preferably provided along the inner liner 10.

The second liner 10 may be formed of the same materials and by the same methods as the first liner 6. Thus, with the plastic material of the second liner having shape memory characteristics,i the deformation of the second liner according to FIG. 3 may also be accomplished by mechanically folding fold 12 at a temperature range between the deformation temperature and the crystallization temperature of the material. When the liner is cooled, its deformed shape is preserved.

Figure 2:
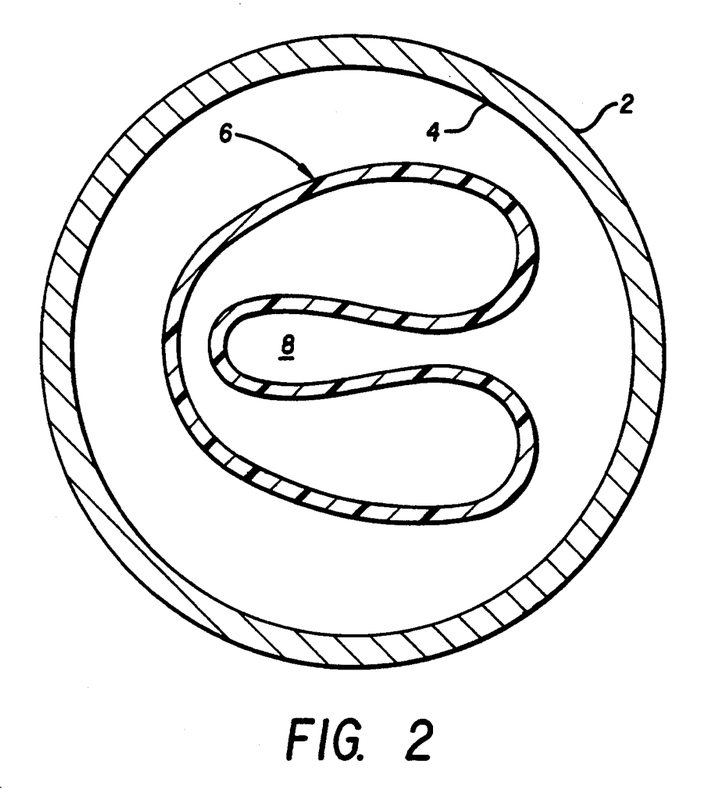
FIG. 2 is a cross-sectional view of a pipeline illustrating the collapsed first liner introduced into a pipe.
Figure 4:
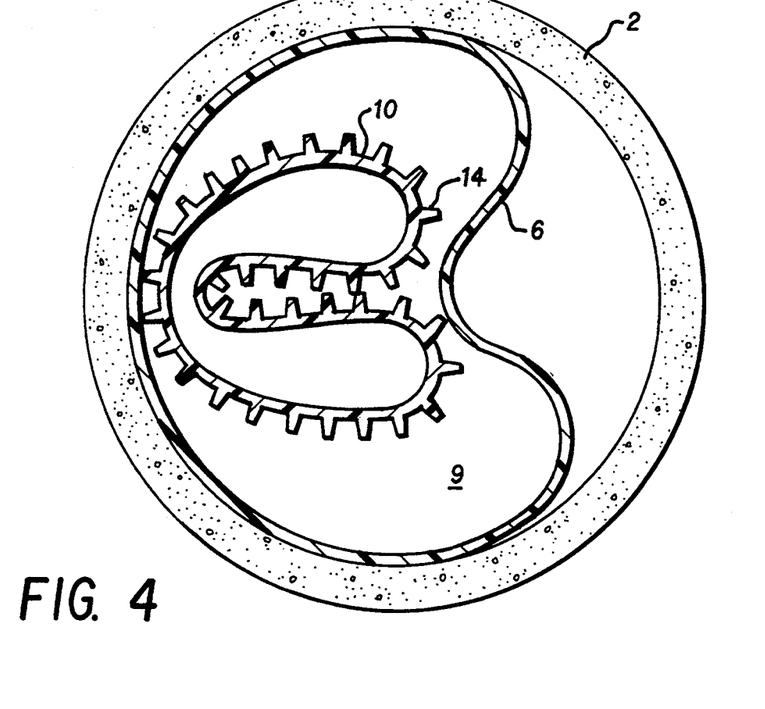
FIG. 4 is a cross-sectional view of a pipe illustrating the first liner in a partially open state, and the second, collapsed liner being introduced into the partially opened first liner.

Referring to FIG. 4, the first liner 6 is partially opened as compared with FIG. 2. To partly open the first liner, hot steam or fluid is forced into the deformed liner. This steam or fluid has a temperature sufficient to obtain the average crystallization temperature of the plastic material so that the liner gradually starts to return to its original cylindrical form. When the first liner is partially opened, as in FIG. 4, the second, deformed liner is pulled into the first liner, as in FIG. 4.

To restore both liners to their original form, hot steam or fluid is forced into the space 9 between the first and second liners 6, 10 and this steam or fluid has a temperature sufficient to obtain an average crystallization temperature of the plastic material so that both liners 6, 10 return to their original cylindrical shape. During this process, the inner void of the interior liner is pressurized, e.g., by air or water pressure. While the liners are preferably reformed to their cylindrical shapes subsequent to installation of both liners within the pipe, the reformation process may be performed sequentially. That is, the outer liner may be disposed in the pipe and reformed to its cylindrical shape before the inner liner is located within the pipe. After this outer liner is reformed, the deformed inner liner may be disposed in the pipe and reformed separately from the first or outer liner.

Figure 5:
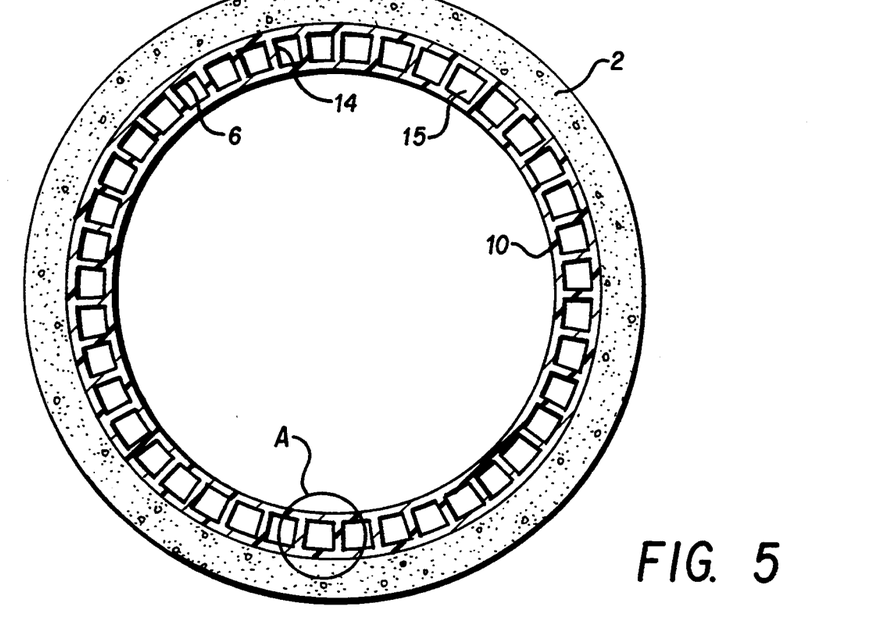
FIG. 5 is a cross-sectional view similar to FIG. 4, illustrating the two liners restored in their cylindrical shape and within the pipe.

When the original cylindrical shapes are recovered, the first liner fits tightly within pipe 2, and the second liner 10 fits tightly within the first liner 6, both liners being under slight circumferential compression, as in FIG. 5. To finalize this shape restoration, hot steam or fluid may additionally be forced into the second liner 10, to press the tubular liners 6, 10 radially against pipe 2. In their restored shape, both liners 6, 10 form a tubular liner arrangement having high rigidity and stability and double containment properties with longitudinal voids between the rib-structure.

Figure 6:
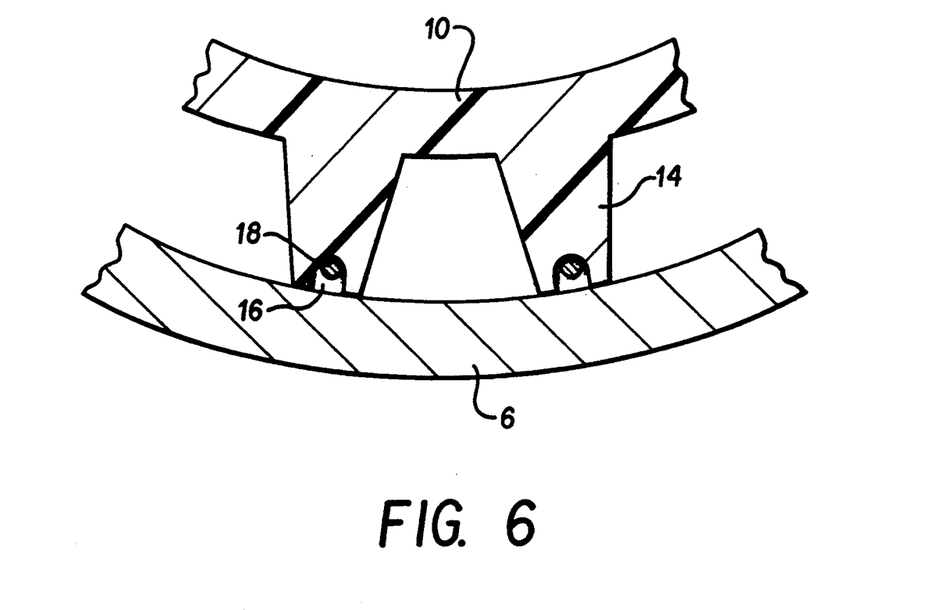
FIG. 6 is an enlarged fragmentary cross-sectional view showing a detail. A of FIG. 5.

Referring now to FIG. 6 of the drawings, the ribs 14 preferably have longitudinally extending channels 16 their free ends. Beads of hot melt adhesive 18 are provided in the channels 16. To finalize the installation, hot steam is forced through these channels 16 so that the adhesive melts, thus gluing the first and second liners 6, 10 together.

Figure 7:
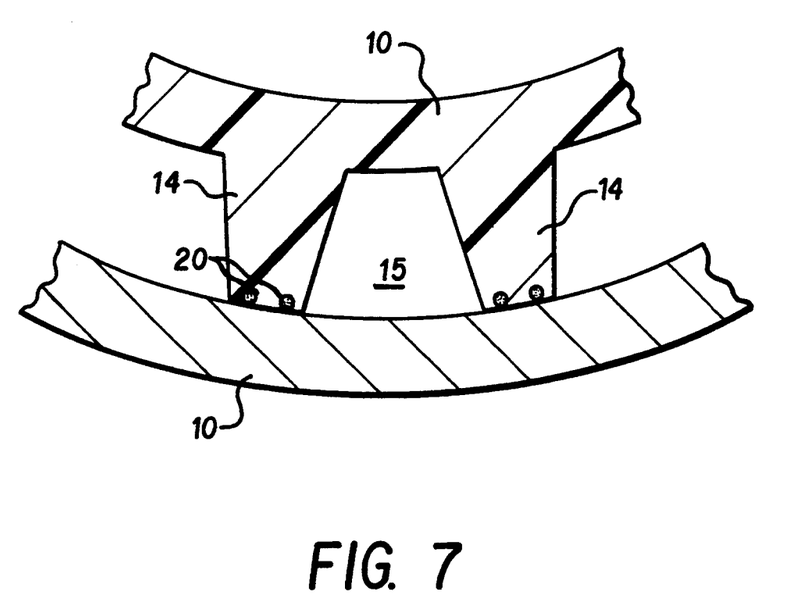
FIG. 7 is an alternative embodiment of the detail A of FIG. 5.

Alternatively, conducting wires 20 may be integrated at the free ends of the ribs 14, as illustrated in FIG. 7. When the wires 20 are energized, electrofusion takes place, and both liners are connected by electrofusion. Alternatively, electroconductive high molecular weight polyethylene might be added to the plastic material at least at the contacting areas of the two liners so that electrofusion can be carried out by simply energizing the respective region electrically.

When both liners are connected together a double containment, high stress resistant compound liner is realized with a minimum amount of material, and the longitudinal voids 15 between the ribs allow a fail-safe control. The voids 15 become the conveyors of liquid or gas leaking through the pipe or liner and that leakage flow along the voids indicates potential problems which may exist in the pipeline. The double wall liner is also a safety margin against the pipeline bursting from internal pressure. Additionally, fiber-optic sensing systems can be installed in the voids to detect and pinpoint leaks instantly. This system further allows any ordinary hazardous liquid pipeline with one tubular liner to be upgraded to an extraordinary fail-safe pipeline simply by introducing the second liner having ribs along its outer surface.

When the liners are made of material with shape memory characteristics, preferably the following plastic or thermosetting or thermoplastic materials may be used: polyethylene, PVC, modified PVC, polybuthylene, polyurethane, or nylons, etc. Inner wall cross linking of the liner materials after installation may also be accomplished at the site. To enhance the properties of the materials along the inner walls of the innermost liner to better accommodate flow, i.e., enhance the slickness of the liner and its resistance to abrasion, an in-situ process of cross-linking may be used. This process is comprised of a chemical treatment of the liner after installation, i.e., flowing nitrogen or fluorides through the liner cross-linking the plastic materials.

Figure 8:
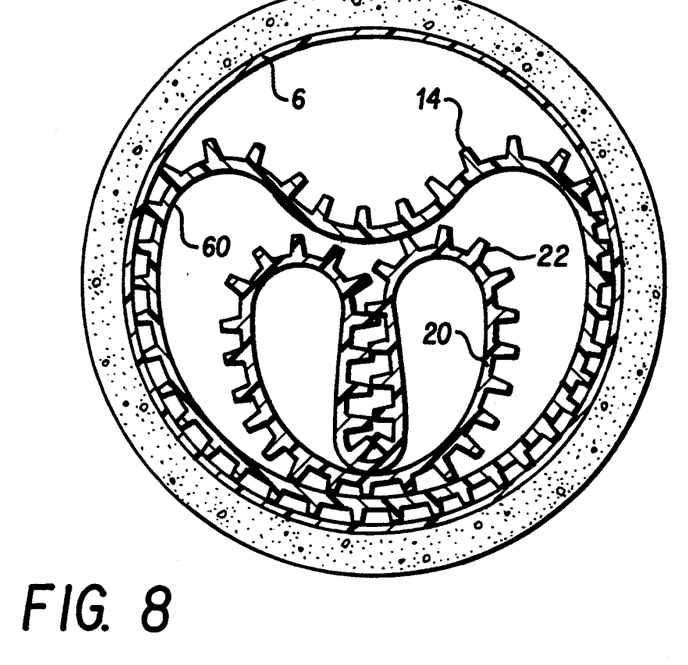
FIG. 8 is a cross-sectional view illustrating three liners disposed within a pipe.
Figure 9:
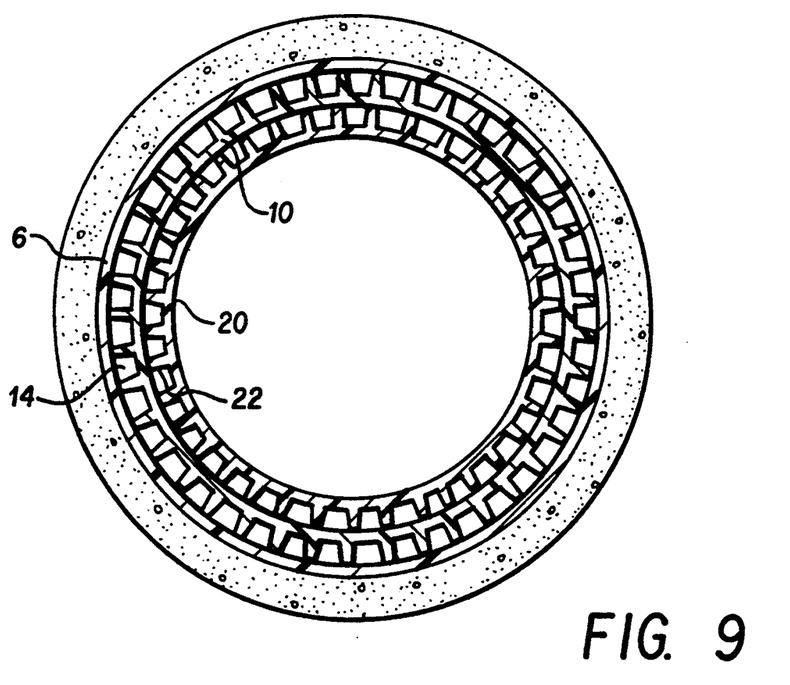
FIG. 9 is a view similar to FIG. 8 illustrating the three liners in their fully restored cylindrical shape within the pipe.

Referring now to FIGS. 8 and 9, there is illustrated a pipeline system employing three discrete liners, the outermost two liners 6 and 10 being formed similarly as in the prior embodiment. In this form, an additional interior liner 20 having longitudinally extending circumferentially spaced ribs or projections 22, similar to the ribs 14, is provided within the intermediate liner 10. Consequently, when the intermediate liner 10 is partially restored to its generally circular configuration, either mechanically or by recall of its shape memory characteristics by the application of hot fluid and or pressure, the innermost liner 12 of the three liners may be inserted into the pipe in its generally compact U-shaped cross-sectional configuration as illustrated in FIG. 8. As in the prior embodiments, steam or hot fluid may be inserted in the areas between the intermediate and inner liners 10 and 20, respectively, to restore those liners to their cylindrical shape. To ensure complete restoration, steam or hot fluid may be passed within the interior of the inner liner 20 such that the inner and intermediate liners 20 and 10, respectively, are restored to their generally circular configuration as illustrated in FIG. 9 with the ribs thereof butting the next outermost liner.

Figure 10:
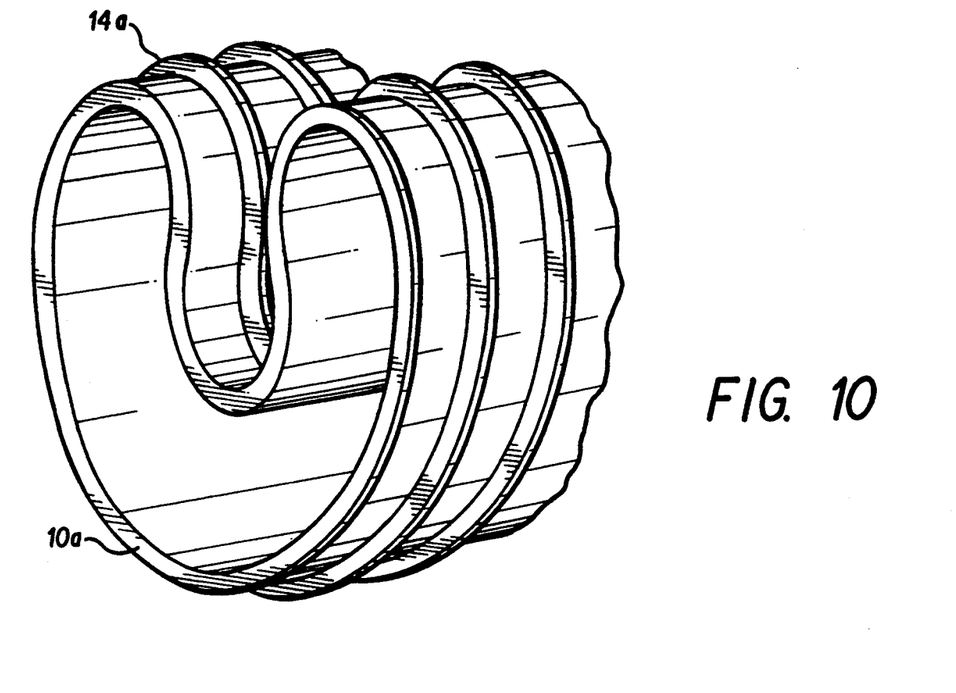
FIG. 10 is a fragmentary perspective view of a liner illustrating generally circumferentially extending ribs about the outer surface of the liner.

Referring now to the embodiment hereof illustrated in FIG. 10, the liner may have generally circumferentially extending ribs 14A. For example, the interior liner 10A may have a plurality of radially outwardly directed ribs 14A at longitudinally spaced positions about the deformed liner which, when the liner is restored to its circular configuration, engage the inner wall of the outermost liner.

Figure 11:
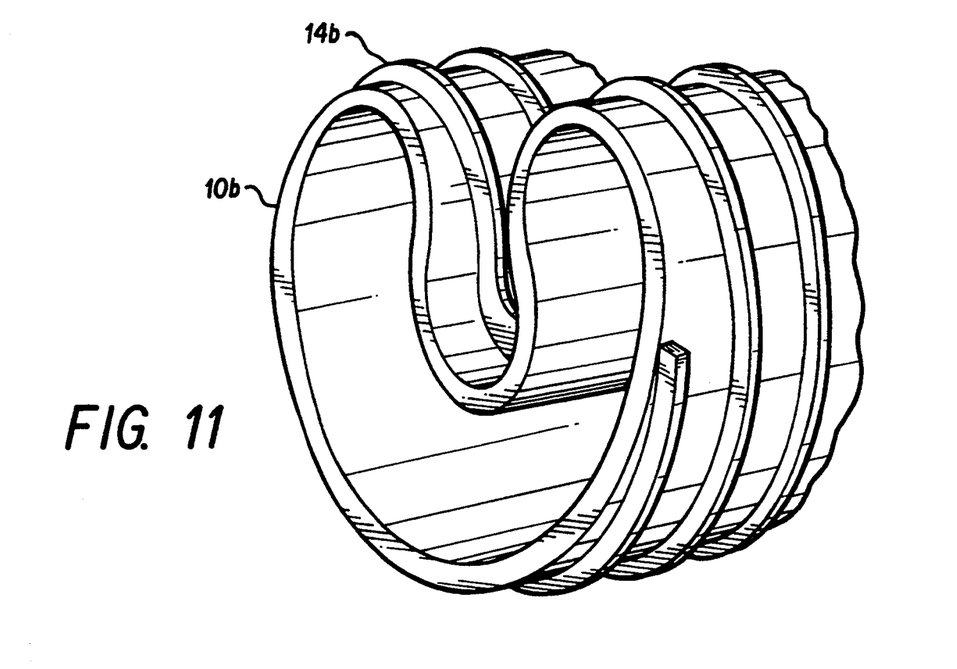
FIG. 11 is a view similar to FIG. 10 illustrating a liner with a helical extending rib along its outer surface.

In FIG. 11, the liner 10B may have one or more continuous helically arranged ribs 14B extending about the outermost surface of the liner.

Figure 12:
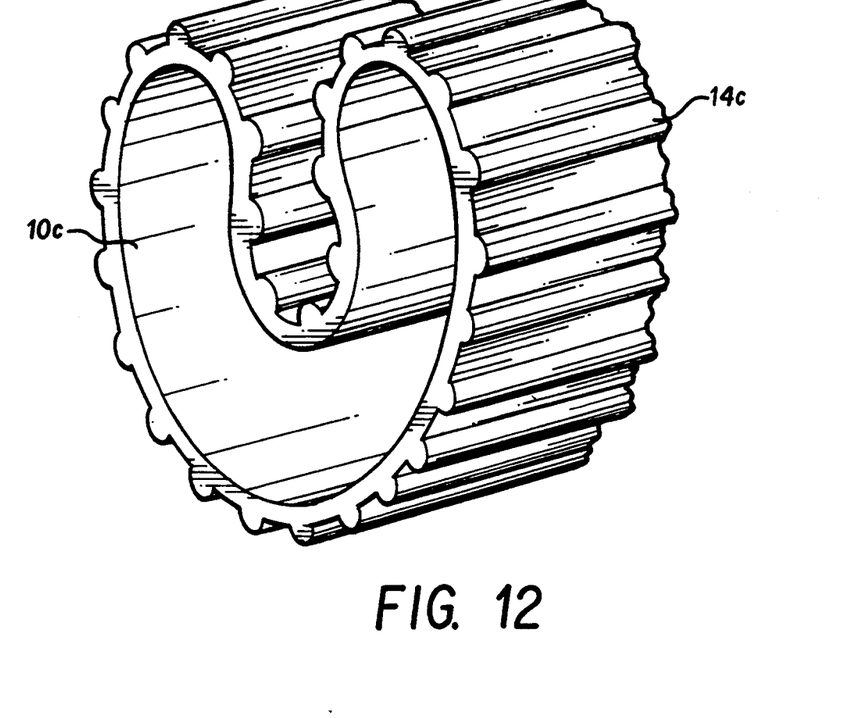
FIG. 12 is a fragmentary perspective view of a liner illustrating a further form of longitudinally extending ribs along its outer surface.

In FIG. 12, the liner 10C may have a plurality of generally longitudinally extending ribs 14C at circumferentially spaced positions about the liner. Each of the ribs 14C may have a semicircular cross-section as illustrated.

Figure 13:
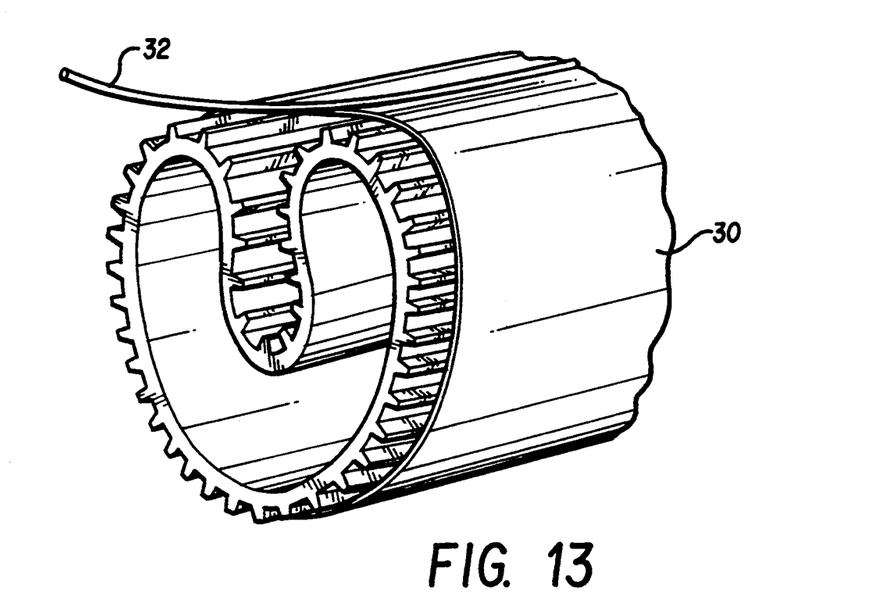
FIG. 13 is a perspective view of a liner mechanically deformed with a wrap maintaining the liner in its deformed configuration.
Figure 14:
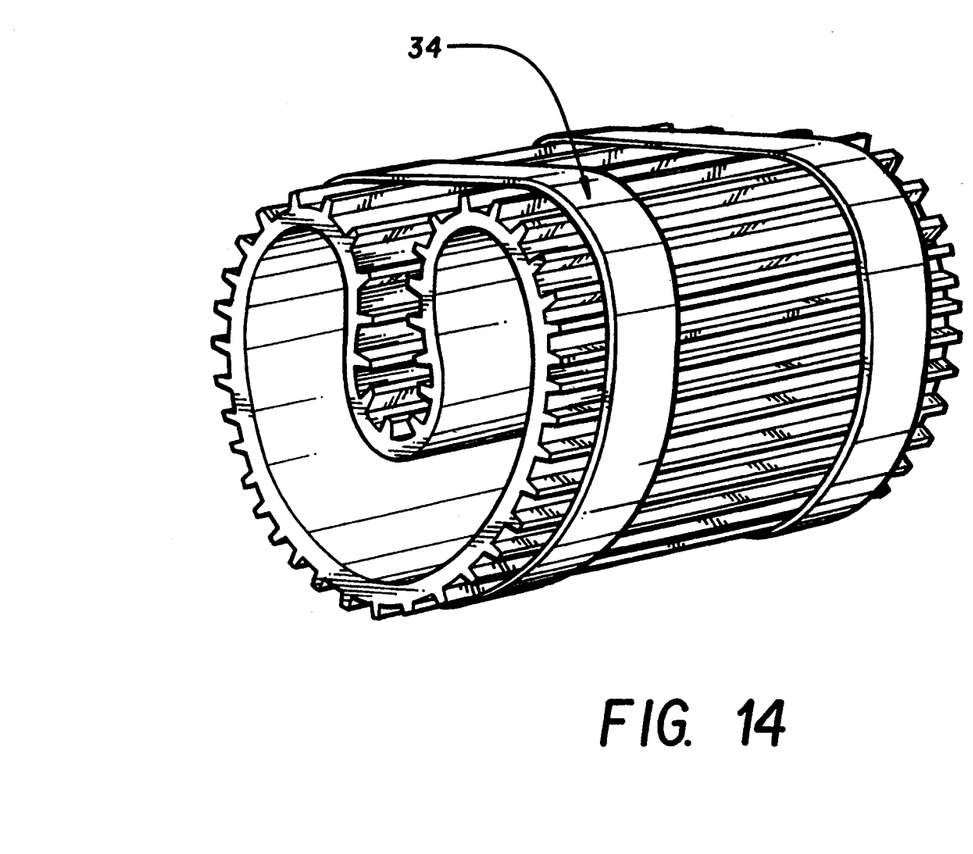
FIG. 14 is a view similar to FIG. 13 illustrating bands maintaining the mechanically deformed liner in its generally U-shaped configuration.

Alternatively, the liners may be produced of elastic material having spring rebounding properties and no shape memory properties as illustrated in FIGS. 13 and The liners are then mechanically collapsed, and they are maintained in their collapsed configuration by a longitudinally extending tearable strap or element which is torn off after the liners are inserted in the pipe. For example, the liner 10d in FIG. 13 may have a wrap 30 about the liner to maintain the liner in the reduced cross-sectional configuration. A fuse wire 32 may be provided along wrap 30 which, when activated, severs the wrap in a longitudinal direction enabling the liner to reform to its generally cylindrical configuration within the pipeline. A single wall system of this type is described and illustrated in U.S. Pat. No. 4,207,130, issued Jun. 10, 1980, the disclosure of which is incorporated by reference herein. In FIG. 14, the liner is wrapped at longitudinally spaced positions therealong by straps 24 which hold the liner in its deformed state but which will break under applied pressure. Thus, after insertion, steam pressure breaks the straps enabling the liner to mechanically reform to its cylindrical shape.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of lining a pipe, comprising the steps of:
   providing a first tubular liner of plastic material deformed from a generally cylindrical shape having an external diameter which corresponds generally to the internal diameter of the pipe, to a reduced diameter enabling reception of the deformed lining in the pipe;
   providing a second tubular liner of plastic material deformed from a generally cylindrical shape having a predetermined external diameter to a reduced diameter enabling reception of the second liner in the first liner;
   providing ribs on one of the inner surface of the first liner and the outer surface of the second liner;
   introducing said first deformed liner into the pipe;
   introducing said second deformed liner into the first liner after introducing said first liner within the pipe such that said ribs lie between said first and second liners in the pipe; and
   restoring the deformed liners while in the pipe to their respective cylindrical shapes to enable the first liner to bear against the internal surface of the pipe and the first and second liners to contact one another by way of said ribs, thereby spacing said liners relative to each other in the pipe.

2. A method according to claim 1 where at least one of the liners is formed of a plastic material having shape memory properties, including the steps of initially providing said one of said first and second tubular liners in its respective cylindrical shape, deforming said one liner at or above a predetermined deforming temperature and below a crystallization temperature of the material and restoring the cylindrical shape of said one liner the pipe by forcing a hot fluid therealong, the temperature of the fluid being sufficient to obtain an average crystallization temperature of the plastic material of the liner.

3. A method according to claim 2 wherein the step of forcing the hot fluid along the liner includes the step of forcing the hot fluid into the space between the first and second liners.

4. A method according to claim 2 including the step of internally pressurizing said first liner to conform said first liner to the interior contour of the pipe.

5. A method according to claim 1 wherein the first liner has been deformed at or above a predetermined deforming temperature and below a crystallization temperature of the material and including the step of forcing hot fluid sufficient to obtain an average crystallization temperature of the plastic material of the first liner into the first liner after introduction of said first liner into the pipe to partially enlarge the cross-section of said first liner prior to receiving the second liner in the pipe.

6. A method according to claim 1 including, after introducing the first and second liners into the pipe, fusing said first and second liners to one another within the pipe.

7. A method according to claim 6 including electrofusing the said first and second liners to one another.

8. A method according to claim 6 including passing hot fluid through fusion channels formed between said ribs along the contacting areas of said liners to fuse the first and second liners to one another.

9. A method according to claim 1 including, after introduction of said first and second liners into the pipe, adhesively securing said first and second liners to one another within the pipe.

10. A method according to claim 1 including providing ribs formed integrally on the inner surface of the first liner.

11. A method according to claim 1 including providing ribs formed integrally on the outer surface of said second liner.

12. A method according to claim 1 including forming longitudinally extending circumferentially spaced voids between said liners.

13. A method according to claim 1 wherein at least one of the liners is formed of semi-rigid material which, in its reduced diameter configuration, has a mechanical tendency to move to its cylindrical shape, disposing at least one severable element about said one liner to maintain said one liner in its reduced diameter, and restoring the cylindrical shape of said one liner by severing the one strap.

14. A method according to claim 13 including applying increased pressure in the one liner to sever said one strap and thereby restore the one liner to its cylindrical shape.

15. A method according to claim 14 wherein said one liner is said first liner and including the steps of severing the strap of the first liner after its insertion into the pipe, and increasing the pressure in the first liner before the second liner is introduced within the first liner.

16. A method according to claim 14 including restoring the first liner to its cylindrical shape before said second deformed liner is introduced into the pipe.

17. A method according to claim 1 wherein the plastic material includes hydrocarbon chains which are cross-linkable and including the step of introducing a chemical agent into the second liner to cross-link the material thereof to improve the flow characteristics of the inner liner.

18. A lining system for a pipe comprising a first tubular liner of plastic material deformed from a generally cylindrical shape having an external diameter which corresponds generally to the internal diameter of the pipe, to a reduced diameter enabling reception of the deformed liner in the pipe, a second tubular liner of plastic material deformed from a generally cylindrical shape having a predetermined exterior diameter to a reduced diameter, said second liner disposed in said first liner, said deformed first and second liners being reformable into said cylindrical shapes, respectively; and a plurality of ribs carried by one of said first and second liners and extending radially between the inner surface of the first liner and the outer surface of said second liner for spacing said liners relative to each other when said liners are reformed into their respective cylindrical shapes in the pipe.

19. A lining system according to claim 18 wherein the plastic material of said at least one liner has shape memory characteristics.

20. A system according to claim 18 wherein said ribs are integrally formed along the inner surface of the first liner.

21. A system according to claim 18 wherein said ribs are integrally formed along the outer surface of said second liner.

22. A system according to claim 18 wherein said ribs extend longitudinally relative to said liners and are spaced circumferentially relative to one another to form a plurality of longitudinally extending voids between said liners.

23. A system according to claim 18 including a third tubular liner of plastic material deformed from a generally cylindrical shape having a predetermined exterior diameter to a reduced diameter enabling reception of the third liner in the second liner and being reformable into cylindrical shape, and a plurality of ribs disposed between said second and third liners for spacing said second and third liners relative to one another when the liners are reformed into their respective cylindrical shapes.

24. A system according to claim 18 wherein the plastic materials of said second liner includes hydrocarbon chains which are cross-linkable.

25. A lining system for a pipe comprising a first tubular liner of plastic material having a generally U-shaped cross-section enabling reception of the U-shaped liner in the pipe, a second tubular liner of plastic material having a generally U-shaped cross-section and receive in the first liner, said first and second liners being reformable from their respective generally U-shaped cross-sections into generally cylindrical shapes, respectively; and a plurality of ribs carried by one of said first and second generally U-shaped liners and projecting between the inner surface of the first liner and the outer surface of said second liner for spacing said liners relative to each other when said liners are reformed into their respective cylindrical shapes in the pipe.

26. A lining system according to claim 25 wherein the plastic material of said at least one liner has shape memory characteristics.

27. A system according to claim 25 wherein said ribs are integrally formed along the inner surface of the first liner.

28. A system according to claim 25 wherein said ribs are integrally formed along the outer surface of said second liner.

29. A system according to claim 25 wherein said ribs extend longitudinally relative to said liners at circumferentially spaced locations about said liners.

30. A system according to claim 25 including a third tubular liner of plastic material having a generally U-shaped cross-section enabling reception of the U-shaped third liner in the second liner and being reformable into a cylindrical shape, and a plurality of ribs disposed between said second and third liners for spacing said second and third liners relative to one another when the liners are reformed into their respective cylindrical shapes.

31. A system according to claim 25 including means carried by said ribs for securing said liners one to the other.

32. A system according to claim 25 wherein the plastic material of said liner includes hydrocarbon chains which are cross-linkable.

* * * * *